United States Patent Office 2,769,745
Patented Nov. 6, 1956

2,769,745

VINYL BENZENE COMPOUND COMPOSITION AND METHOD FOR THE TREATMENT OF SOIL

John L. Hardy, Midland, Mich., assignor to The Dow Chemical Company, Midland, Mich., a corporation of Delaware No Drawing. Application January 18, 1954, Serial No. 404,771

7 Claims. (Cl. 167—39)

The present invention is concerned with the treatment of soil or growth media and is particularly directed to a method and composition for the control of soil inhabiting fungi and nematodes which attack the underground parts of plants.

It is an object of the present invention to provide an improved method for the fumigation and disinfection of soil infested with fungi and nematodes which attack plant roots. A further object is to provide a novel soil composition. Another object is the provision of a novel composition adapted to be employed in the new method of fumigation. Other objects will become apparent from the following specification and claims.

According to the present invention it has been discovered that soil-inhabiting nematodes and fungi which attack the underground parts of plants may be controlled by impregnating soil or growth media with at least one member of the group consisting of divinyl benzene and ethyl vinyl benzene. These compounds are adapted conveniently and readily to be distributed in soil and related growth media without particular hazard to man and higher animals. Compositions comprising divinyl benzene and/or ethyl vinyl benzene as active ingredients in association with various carriers, surface active agents and other additaments, have been found to be very useful in the treatment of soil and other growth media. It is among the advantages of the present invention that the named compounds permeate the media for a distance of several inches from the point of application depending upon the temperature, moisture content, compactness and physical consistency of the media. It is a further advantage that the compounds are sufficiently persistent to accomplish the desired effect but dissipate in a reasonable period of time.

Divinyl benzene and ethyl vinyl benzene are flammable liquids which are somewhat soluble in many organic solvents and of low solubility in water. The compounds have about the same degree of flammability as kerosene. Although they are somewhat unstable and have a tendency to polymerize at ordinary temperatures, they may be stabilized by the addition of a very small amount of a polymerization inhibitor such as para-tertiary butyl catechol. In the stabilized form, the compounds are articles of commerce available as clear mobile liquids.

The distribution of an effective dosage of divinyl benzene or ethyl vinyl benzene, or of a mixture of the vinyl benzene compounds is essential for the practice of the present invention. In general, good results are obtained when either compound or a mixture of the two materials is distributed through the soil in the amount of from about 24 to 200 parts or more by weight per million parts by weight of soil. In field applications, the divinyl benzene or ethyl vinyl benzene or a mixture of the two materials may be distributed in the soil at a dosage of from about 12 to 200 pounds or more per acre, and through such a cross-section of the soil as to provide for the presence therein of a parasiticidal concentration of toxicant. In such applications, it is desirable that the toxicant be distributed to a depth of at least 2 inches below the soil surface. When the treatment is carried out by injection or drilling technique, it is preferred that the maximum distance between deposits be not in excess of about 10 inches. In the row treatment of existing vegetation, the products may be employed in accordance with known side-dressing techniques.

In carrying out the method of the present invention, the soil-dwelling nematodes or fungi may be controlled by distributing in the soil or other growth media the unmodified vinyl benzene compounds. However, the present method also embraces the employment of a liquid or dust composition containing the compounds. In such usage, the vinyl benzene compounds may be modified with one or more of a plurality of additaments including solvents or other liquid carriers, surface active dispersing agents and finely divided inert solids. Depending upon the concentration of the vinyl benzene compounds, such augmented compositions are adapted to be distributed in the soil, or employed as concentrates and subsequently diluted with additional inert carrier to produce the ultimate treating compositions. The required amount of the vinyl benzene compounds may be supplied per acre treated in from 20 to 27,000 gallons or more of the liquid carrier or in from about 75 to 1,000 pounds of the solid carrier.

The exact concentration of the vinyl benzene compounds to be employed in compositions for the treatment of growth media may vary provided the required dosage of effective agent is supplied. The concentration of toxicant in liquid compositions employed to supply the desired dosage generally is from about 0.01 to 50 percent by weight although as high a concentration as 90 percent by weight may be employed. In dusts, the concentration of the effective agent may be from about 1 to 20 percent by weight. In compositions to be employed as concentrates, the ethyl vinyl benzene or divinyl benzene or mixture of the two materials may be present in a concentration of from about 5 to 95 percent by weight.

Liquid compositions containing the desired amount of effective agent may be prepared by dissolving the toxicant in an organic liquid such as acetone, methylene chloride, chlorobenzene, and petroleum distillates, or by dispersing the toxicant in water with the aid of a suitable surface active dispersing agent such as an ionic or non-ionic dispersing and emulsifying agent. The preferred organic solvent carriers are those which are adapted to accomplish the penetration and impregnation of the soil with the toxicant compounds, and are of such volatility as to evaporate from the growth media and leave little permanent residue therein.

The aqueous compositions to be employed in the present method may contain one or more water-immiscible solvents for the vinyl benzene compounds. In such compositions, the carrier comprises an aqueous emulsion, i. e. a mixture of water-immiscible solvent, emulsifying agent and water. The choice of dispersing and emulsifying agent and the amount thereof employed is dictated by the nature of the composition type and by the ability of the agent to facilitate the dispersion of the effective agent in the aqueous carrier to produce the desired composition. Dispersing and emulsifying agents which may be employed in the compositions include the condensation products of alkylene oxides with phenols and organic acids, alkyl aryl sulfonates, polyoxyethylene derivatives of sorbitan esters, complex ether alcohols, mahogany soaps and the like.

In the preparation of dust compositions, the vinyl benzene compounds are dispersed in and on a finely divided solid such as talc, chalk, gypsum and the like. In such operations, the finely divided carrier is mixed or wet with the toxicant or a solution thereof in a volatile organic solvent. Similarly, dust compositions containing the vinyl benzene compounds may be prepared from various of the solid surface-active dispersing agents such as bentonite, fuller's earth, attapulgite and other clays. Depending upon the proportion of ingredients, these dust compositions may be employed as concentrates and subsequently diluted with additional solid surface-active dispersing agent or with talc, chalk, gypsum and the like to obtain the desired amount of active ingredient in a composition adapted to be distributed in soil. Also such concentrate dust compositions may be dispersed in water, with or without the aid of a dispersing agent, to form aqueous soil treating compositions.

A further embodiment of the present invention is a novel composition comprising growth media in admixture with an effective concentration of the vinyl benzene compounds.

When operating in accordance with the present invention, the soil or growth media may be impregnated in any convenient fashion with divinyl benzene or ethyl vinyl benzene or a combination of the materials, or with a composition containing these effective agents, e. g. by simple mixing with the growth media, by employing a liquid carrier to accomplish the impregnation, or by injection or drilling techniques whereby the toxicant or a solution thereof is deposited beneath the surface of the soil. In general, it is desirable that the distribution be carried out at a soil temperature of 45° F. or higher since the effectiveness of the toxicants may be somewhat reduced at lower temperatures.

In a preferred embodiment, the method of the present invention is carried out in soil having a moisture content of from about 50 to 100 percent of the moisture equivalent of the soil. When operating under such soil conditions, maximum controls of invertebrate organisms are obtained. Thompson, L. M. in "Soils and Soil Fertility," McGraw Book Company, Inc. (1952) defines the moisture equivalent of a soil as equal to the percentage of water retained by wet soil after being centrifuged at 1000 times gravity. This equivalent is about the same as the so-called field capacity which may be defined as the moisture condition of the soil when downward movement of water into the soil has virtually ceased. The moisture equivalent or field capacity is dependent primarily upon the percentage of organic matter in the soil, the size of the soil particles and the porosity of the soil.

In a further method, the distribution may be accomplished by introducing the toxicant in the water employed to irrigate the soil. In this method, the amount of water may be varied in accordance with the moisture equivalent or field capacity of the soil in order to obtain the desired depth of distribution of the toxicant at a soil moisture content equal to the moisture equivalent. Following the distribution of the vinyl benzene compounds it is preferred that the planting operation not be carried out for a period of at least several days. When following such a practice, no adverse effect upon germination of seeds or growth of the transplants is observed. Further, where minimum dosages are employed as, for example, in sidedressing operations, existing mature vegetation of species resistant to the compounds is not unfavorably affected by the concentrations of the treating compositions temporarily present in the soil.

The following examples illustrate the invention but are not to be construed as limiting the same:

Example 1

Several vinyl benzene mixtures containing varying amounts of divinyl benzene and ethyl vinyl benzene are separately dissolved in methylene dichloride to produce soil-treating compositions containing 26 grams of toxicant per liter of ultimate mixture. The vinyl benzene mixtures as employed in these compounding operations contain substantial amounts of the ortho-, meta- and para-isomers of divinyl benzene and ethyl vinyl benzene. The solvent compositions are employed for the treatment of a sandy loam soil which is heavily infested with the fungal organisms, Fusarium spp., *Pythium debaryanum* and *Rhizoctonia solani*. In such operations, the soil is placed in sealable containers and thereafter treated with the solvent compositions at a dosage of 100 pounds of toxicant per acre. In the treating operations, the distribution is accomplished by injection to give a concentration of about 104 parts by weight of toxicant per million parts by weight of soil. The containers of treated soil are then sealed and set aside at a temperature of about 25° C.

After three days, the containers are unsealed and the treated soil allowed to aerate for about three days and thereafter planted with cucumber seeds. In a check operation, untreated but similarly infested soil is also planted with cucumber seeds. About seven days following the seeding operations, the plots are inspected to determine the percentage emergence of disease-free seedlings. The results are set forth in the following table, together with the chemical constitution of the vinyl benzene mixtures employed in the preparation of the solvent compositions:

| Toxicant | | Boiling point of vinyl benzene mixture ° C. | Percent emergence of disease-free seedlings |
|---|---|---|---|
| Percent by weight of active ingredient in the vinyl benzene mixture | | | |
| Divinyl benzene | Ethyl vinyl benzene | | |
| 50 | 50 | 195 | 90 |
| 75 | 25 | 197.5 | 89 |
| 5 | 95 | 192–193 | 76 |
| 95 | 5 | 198 | 69 |
| 0 | [1] 0 | ---------- | 22 |

[1] Check.

Example 2

Fifty parts by weight of meta-ethyl vinyl benzene (boiling at about 191.5° C. at atmospheric pressure), 45 parts of chlorobenzene and 5 parts of a dimeric alkylated aryl polyether alcohol (Triton X–155) are mechanically mixed together to prepare a soil-treating composition in the form of an emulsifiable liquid. In a similar manner, 95 parts by weight of the 50–50 vinyl benzene mixture of Example 1 (boiling at 195° C.) and 10 parts by weight of Triton X–155 are mixed together to prepare a concentrate composition in the form of a water-dispersible liquid. These compositions are adapted to be dispersed in water to prepare aqueous soil treating compositions which have very desirable wetting and penetrating properties. The latter aqueous compositions may be employed to treat soil and distribute the toxicant compounds therein in fungicidal and nematocidal concentrations.

Example 3

Meta-divinyl benzene (boiling at about 199.5° C. at atmospheric pressure) is dissolved in acetone to produce a soil-treating composition containing 85 grams of toxicant per liter of ultimate mixture. This composition is employed for the treatment of a sandy loam seed bed which is heavily infested with the organisms Fusarium spp., *Pythium debaryanum* and *Rhizoctonia solani*. The treatment is accomplished by injection to distribute the solvent mixture through the top 3 inches of soil at a substantially uniform rate of 40 pounds of meta-divinyl benzene per acre to give a concentration of about 37 parts by weight of toxicant per million parts by weight of soil.

One week later the treated seed beds and others containing soil from untreated but similarly infested check plots are planted with cucumber seeds. Three weeks after seeding, the plots are inspected to determine the percentage emergence of disease-free seedlings. From the examination, there is found a substantially complete emergence of disease-free seedlings in the treated plot. In the check plots few seedlings are found to have emerged, the roots of such emerged seedlings being heavily infested with the complex of root rot fungi.

*Example 4*

A vinyl benzene mixture boiling at about 195° C. and containing about equal amounts of divinyl benzene and ethyl vinyl benzene is dissolved in a petroleum hydrocarbon fraction boiling at from 190° to 272° F. (Standard Thinner No. 250) to produce a fumigant composition containing 85 grams of the vinyl benzene mixture per liter of ultimate composition. This composition is employed for the treatment of a root-knot nematode infested sandy loam soil having a moisture content of about 10 percent. In these operations, the composition is injected into the soil in an amount sufficient to supply 192 pounds of toxicant per acre foot. The latter dosage corresponds to a concentration of about 47 parts by weight of toxicant per million parts by weight of soil. Following the application, the average soil temperature remains at about 62° F.

One week after treatment, samples of soil from the treated plots and from untreated check plots are examined microscopically and counts of nematodes made in order to determine the percentage control of this organism. The examination indicates that an 84 percent control of nematodes is obtained in the treated soil.

*Example 5*

Meta-ethyl vinyl benzene (boiling at about 191.5° C. at atmospheric pressure) is dissolved in a petroleum fraction boiling at from about 325° to 400° F. (commonly known as Stoddards solvent) to prepare a soil treating composition containing about 20 percent by volume of toxicant. This composition is employed for the treatment of a seed bed containing a sandy loam soil which is heavily infested with root knot nematodes. At the time of treatment the soil has a moisture content of about 10 percent. This moisture content is about 80 percent of the moisture equivalent or field capacity of the soil. The distribution is accomplished by injecting the fumigant solution into the soil in rows 10 inches apart, the injections being made at 4 inch intervals and at a depth of 6 inches below the soil surface. The amount of fumigant material employed is sufficient to supply 130 pounds of meta-ethyl vinyl benzene per acre. This dosage corresponds to a concentration of about 60 parts by weight of the benzene compound per million parts by weight of soil. Following the application, the average soil temperature remains at about 62° F. for the period of the determination.

Ten days after the treatment, the soil is seeded with tomato plants, the seeded soil being that positioned midway between the injection rows and approximately 5 inches from the loci of treatment. Untreated check plots are also planted with tomato seeds. During the subsequent growing period, there is observed no adverse effect upon the germination and growth of seedlings attributable to the presence of residual fumigant. About 5 weeks after seeding, the plants are lifted from the soil, and the roots washed and examined for gall formation attributable to nematode attack. The examination of the plants indicates a commercial control of nematodes in the treated soil with heavy infestation in the check plots.

The expression "growth media" is employed in the present specification and claims in its broadest sense to be inclusive of all conventional "soils," as defined in Webster's New International Dictionary, Second Edition, Unabridged, published in 1937 by G. and C. Merriam Company, Springfield, Massachusettes. Thus, the term refers to any substance or media in which vegetation may take root and grow, and is intended to include not only earth but compost, manure, muck, humus, and sand and the like, adapted to support plant growth.

The expression "surface active dispersing agent" as herein employed is intended to include all agents which are capable of acting at the interfacial surface between divinyl benzene or ethyl vinyl benzene and water as the dispersion medium, so as to facilitate the dispersion of the vinyl benzene compounds in water. Thus, the term is inclusive of the solid emulsifying agents such as finely divided aluminum hydroxide and finely divided bentonite, fuller's earth, attapulgite and other clays, as well as the ionic and non-ionic wetting and emulsifying agents such as the alkaline earth metal caseinates, alkyl aryl sulfonates, sulfonated oils, complex organic ester derivatives, complex ether alcohols, and the like.

The term "finely divided inert solid" as herein employed refers to materials which are incapable of facilitating the dispersion of the water-immiscible divinyl benzene or ethyl vinyl benzene in water as the dispersion medium and is intended to include finely divided materials such as chalk, talc, pyrophyllite, gpysum and the like.

I claim:
1. A method which comprises impregnating soil with at least one member of the group consisting of divinyl benzene and ethyl vinyl benzene.
2. A method which comprises impregnating soil with an active agent in the amount of at least 24 parts by weight per million parts by weight of soil, the active agent being at least one member of the group consisting of divinyl benzene and ethyl vinyl benzene.
3. A method which comprises impregnating soil with at least one member of the group consisting of divinyl benzene and ethyl vinyl benzene as an active agent, the impregnation being carried out at a substantially uniform rate of at least 12 pounds per acre and through such a cross section of the soil as to provide for the presence therein of a concentration of said active agent of at least 24 parts by weight per million parts by weight of soil.
4. The method claimed in claim 3 wherein the soil is impregnated with divinyl benzene.
5. The method claimed in claim 3 wherein the soil is impregnated with ethyl vinyl benzene.
6. A concentrate composition comprising at least 5 percent by weight of an active ingredient in intimate association with a surface active dispersing agent, the active ingredient being at least one member of the group consisting of divinyl benzene and ethyl vinyl benzene.
7. A composition comprising at least 0.1 percent by weight of an active ingredient in intimate association with a liquid solution of a surface active dispersing agent as a carrier therefore, the active ingredient being at least one member of the group consisting of divinyl benzene and ethyl vinyl benzene.

References Cited in the file of this patent

Frear: Chemistry of Insecticides, Fungicides and Herbicides, 2nd ed. (1948), pages 122, 271. (Copy in Sci. Libr.)